United States Patent
Du

(10) Patent No.: US 6,735,846 B2
(45) Date of Patent: May 18, 2004

(54) METHOD FOR FORMING AN ELECTRIC MOTOR HAVING ARMATURE COATED WITH A THERMALLY CONDUCTIVE PLASTIC

(75) Inventor: Hung T. Du, Reistertown, MA (US)

(73) Assignee: Black & Decker Inc., Newark, DE (US)

( * ) Notice: Subject to any disclaimer, the term of this patent is extended or adjusted under 35 U.S.C. 154(b) by 0 days.

(21) Appl. No.: 10/167,342

(22) Filed: Jun. 10, 2002

(65) Prior Publication Data

US 2002/0148100 A1 Oct. 17, 2002

Related U.S. Application Data

(62) Division of application No. 09/756,959, filed on Jan. 9, 2001, now abandoned.

(51) Int. Cl.$^7$ .............................. H02K 15/16; H02K 1/04
(52) U.S. Cl. .............................. 29/596; 29/598; 310/43; 310/45; 310/62; 310/63; 310/214; 310/215
(58) Field of Search .................... 29/596, 598; 310/43, 310/45, 62, 63, 215, 214; 264/272.19, 272.2, 272.15, 272.13

(56) References Cited

U.S. PATENT DOCUMENTS

| | | |
|---|---|---|
| 1,642,057 A | 9/1927 | Apple |
| 2,019,064 A | 10/1935 | Apple |
| 2,232,812 A | 2/1941 | Studer |
| 2,381,533 A | 8/1945 | Forss |
| 2,618,757 A | 11/1952 | Wieserman et al. |
| 2,683,233 A | 7/1954 | Ruhl |
| 2,747,119 A | 5/1956 | Petersen et al. |
| 2,820,914 A | 1/1958 | Rudoff et al. |
| 2,822,483 A | 2/1958 | deJean et al. |
| 2,949,555 A | 8/1960 | Paul |

(List continued on next page.)

FOREIGN PATENT DOCUMENTS

| | | |
|---|---|---|
| AT | 240458 | 5/1965 |
| DE | 873 272 | 4/1953 |
| DE | 1 021 466 | 12/1957 |
| DE | 1 844 364 | 1/1962 |
| DE | 1 488 502 | 5/1969 |
| DE | 1 805 369 | 10/1969 |
| DE | 1 922 427 | 11/1970 |
| DE | 77 08 518 | 7/1977 |

(List continued on next page.)

OTHER PUBLICATIONS

International Search Report—PCT/US01/44902; ISA/EPO, Feb. 25, 2002.

*Primary Examiner*—Carl J. Arbes
*Assistant Examiner*—Tai Van Nguyen
(74) *Attorney, Agent, or Firm*—Harness, Dickey & Pierce, P.L.C.

(57) ABSTRACT

A method for forming an electric motor includes providing a stator and an armature having a lamination stack with slots therein in which magnet wires are wound. Thermally conductive plastic is molded over at least a portion of the armature to at least partially encase the magnet wires and to mold a fan. The fan is molded without any portion of the fan extending into the slots in the lamination stack of the armature to increase the volume in the slots in which the magnet wires can be wound and the magnet wires are wound in this increased volume when they are wound in the slots in the lamination stack to increase a power rating of the electric motor beyond what is normally attainable with a fan component having portions extending into the slots in the lamination stack.

4 Claims, 1 Drawing Sheet

U.S. PATENT DOCUMENTS

| | | | |
|---|---|---|---|
| 2,997,776 A | 8/1961 | Matter et al. | |
| 3,151,262 A | 9/1964 | Howard et al. | |
| 3,182,383 A | 5/1965 | Rosenberg et al. | |
| 3,212,170 A | 10/1965 | Marshall | |
| 3,388,458 A | 6/1968 | Logan | |
| 3,407,491 A | 10/1968 | Clevenger et al. | |
| 3,427,264 A | 2/1969 | Forster et al. | |
| 3,436,815 A | 4/1969 | Sheets | |
| 3,468,020 A | 9/1969 | Carlson et al. | |
| 3,588,560 A | 6/1971 | Akselsen | |
| 3,618,929 A | 11/1971 | Upchurch | |
| 3,688,137 A | 8/1972 | Filhol | |
| 3,737,988 A * | 6/1973 | Bednarski | 29/596 |
| 3,758,799 A | 9/1973 | Dochterman et al. | |
| 3,813,294 A | 5/1974 | Dyer et al. | |
| 3,874,073 A | 4/1975 | Dochterman et al. | |
| 3,911,299 A | 10/1975 | Kristen et al. | |
| 3,939,020 A | 2/1976 | Caramanian | |
| 3,991,152 A | 11/1976 | Santi et al. | |
| 4,038,741 A | 8/1977 | Schuler | |
| 4,083,735 A | 4/1978 | Caramanian | |
| 4,087,712 A | 5/1978 | Mosimann et al. | |
| 4,128,527 A | 12/1978 | Kinjo | |
| 4,159,562 A | 7/1979 | Liptak et al. | |
| 4,219,748 A | 8/1980 | Sakaguchi et al. | |
| 4,235,656 A | 11/1980 | Shimada et al. | |
| 4,263,711 A | 4/1981 | Sakano et al. | |
| 4,341,972 A | 7/1982 | Penn et al. | |
| 4,349,760 A | 9/1982 | Diepers | |
| 4,387,311 A | 6/1983 | Kobayashi et al. | |
| 4,399,949 A | 8/1983 | Penn et al. | |
| 4,434,546 A | 3/1984 | Hershberger | |
| 4,553,320 A | 11/1985 | Bryant-Jeffries et al. | |
| 4,559,464 A | 12/1985 | Stokes | |
| 4,560,893 A | 12/1985 | van de Griend | |
| 4,616,407 A | 10/1986 | Tamaki et al. | |
| 4,624,884 A | 11/1986 | Harada et al. | |
| 4,682,410 A | 7/1987 | Kreuzer et al. | |
| 4,782,254 A | 11/1988 | Kreuzer et al. | |
| 4,800,315 A | 1/1989 | Schulz et al. | |
| 4,818,910 A | 4/1989 | Reisenweber | |
| 4,823,032 A | 4/1989 | Ward et al. | |
| 4,888,508 A | 12/1989 | Adam et al. | |
| 4,908,534 A | 3/1990 | Gubler et al. | |
| 4,908,535 A | 3/1990 | Kreuzer et al. | |
| 4,918,801 A | 4/1990 | Schwarz et al. | |
| 4,922,604 A | 5/1990 | Marshall et al. | |
| 4,938,866 A | 7/1990 | Ward | |
| 4,963,776 A | 10/1990 | Kitamura | |
| 4,983,866 A * | 1/1991 | Lok | 310/43 |
| 4,998,448 A | 3/1991 | Ellis, Jr. | |
| 5,003,212 A | 3/1991 | Ibe et al. | |
| 5,095,612 A | 3/1992 | McAvena | |
| 5,121,021 A | 6/1992 | Ward | |
| 5,130,596 A | 7/1992 | Umeki | |
| 5,141,768 A | 8/1992 | Ibe et al. | |
| 5,199,992 A | 4/1993 | Hines et al. | |
| 5,201,248 A | 4/1993 | Ibe et al. | |
| 5,233,249 A | 8/1993 | Schaeftlmeier et al. | |
| 5,244,608 A | 9/1993 | Andersen | |
| 5,267,140 A | 11/1993 | Ibe | |
| 5,268,607 A | 12/1993 | McManus | |
| 5,313,698 A | 5/1994 | Schaeftlmeier et al. | |
| 5,329,199 A | 7/1994 | Yockey et al. | |
| 5,341,561 A | 8/1994 | Schorm et al. | |
| 5,352,948 A | 10/1994 | Kirn et al. | |
| 5,384,339 A | 1/1995 | Starkey | |
| 5,449,963 A * | 9/1995 | Mok | 310/270 |
| 5,459,190 A | 10/1995 | Nakamura et al. | |
| 5,477,092 A | 12/1995 | Tarrant | |
| 5,490,319 A | 2/1996 | Nakamura et al. | |
| 5,567,284 A | 10/1996 | Bauer et al. | |
| 5,572,787 A | 11/1996 | Cardini et al. | |
| 5,584,114 A | 12/1996 | McManus | |
| 5,606,791 A | 3/1997 | Fougere et al. | |
| 5,634,258 A | 6/1997 | Onodera et al. | |
| 5,668,428 A | 9/1997 | Stojkovich et al. | |
| 5,714,827 A | 2/1998 | Hansson | |
| 5,715,590 A | 2/1998 | Fougere et al. | |
| 5,727,307 A * | 3/1998 | Gstohl et al. | 29/597 |
| 5,731,646 A | 3/1998 | Heinze et al. | |
| 5,731,651 A * | 3/1998 | Hyodo | 310/261 |
| 5,783,877 A | 7/1998 | Chitayat | |
| 5,783,888 A | 7/1998 | Yamano | |
| 5,806,169 A | 9/1998 | Trago et al. | |
| 5,821,654 A | 10/1998 | Woo | |
| 5,845,389 A | 12/1998 | Roberts et al. | |
| 5,908,883 A | 6/1999 | Caramanian | |
| 5,911,685 A | 6/1999 | Siess et al. | |
| 5,921,913 A | 7/1999 | Siess | |
| 5,925,467 A | 7/1999 | Strumpler et al. | |
| 5,955,812 A | 9/1999 | Warner | |
| 5,960,532 A | 10/1999 | Hill | |
| 5,964,694 A | 10/1999 | Siess et al. | |
| 5,982,056 A | 11/1999 | Koyama et al. | |
| 5,998,905 A | 12/1999 | Fougere et al. | |
| 6,020,661 A | 2/2000 | Trago et al. | |
| 6,057,626 A | 5/2000 | Tanaka et al. | |
| 6,060,799 A | 5/2000 | McManus et al. | |
| 6,078,121 A | 6/2000 | Poag et al. | |
| 6,139,487 A | 10/2000 | Siess | |
| 6,145,585 A | 11/2000 | Wei | |
| 6,166,468 A | 12/2000 | Suzuki et al. | |
| 6,171,418 B1 | 1/2001 | Caramanian | |
| 6,173,915 B1 | 1/2001 | Cohen et al. | |
| 6,214,906 B1 | 4/2001 | Caramanian | |
| 6,268,678 B1 | 7/2001 | Asao et al. | |
| 6,281,612 B1 | 8/2001 | Asao et al. | |
| 6,317,963 B1 | 11/2001 | Powers et al. | |
| 6,362,554 B1 | 3/2002 | Neal | |

FOREIGN PATENT DOCUMENTS

| | | |
|---|---|---|
| DE | 27 12 403 | 9/1978 |
| DE | 28 38 179 | 3/1979 |
| DE | G 80 21 477 3 | 8/1980 |
| DE | 29 19 485 | 12/1980 |
| DE | P21 43 542.7-32 | 4/1982 |
| DE | 31 15 713 | 11/1982 |
| DE | 32 34 275 | 3/1984 |
| DE | 35 22 084 | 1/1987 |
| DE | 35 28 492 | 2/1987 |
| DE | 38 14 040 | 11/1989 |
| DE | 38 33 574 | 4/1990 |
| DE | 42 41 404 | 6/1994 |
| DE | 195 09 835.8 | 3/1995 |
| DE | 44 27 426 | 5/1995 |
| DE | P44 21 855.9 | 1/1996 |
| DE | P44 30073.5 | 2/1996 |
| DE | 195 03 085 | 9/1996 |
| DE | 197 01 307 | 7/1998 |
| DE | 197 35 748 | 7/1998 |
| DE | 197 49 108 | 4/1999 |
| DE | 198 54 642 | 6/2000 |
| DE | 199 02 837 | 8/2000 |
| DE | 298 21 564.0 | 8/2000 |
| DE | 199 05 869 | 10/2000 |
| DE | 199 43 446 | 3/2001 |
| DE | 199 54 314 | 5/2001 |
| DE | 100 52 913 | 7/2001 |
| EP | 78100755.4 | 4/1979 |
| EP | 89107829.7 | 4/1989 |

| | | | | | | |
|---|---|---|---|---|---|---|
| EP | 91909297.3 | 5/1991 | | JP | 5-199717 | 8/1993 |
| EP | 92105190.0 | 10/1992 | | JP | 7-75271 | 3/1995 |
| EP | 93101340.3 | 1/1993 | | JP | 7-123618 | 5/1995 |
| EP | 0 581 966 | 2/1994 | | JP | PO-HEi07-123642 | 5/1995 |
| EP | 96909912.6 | 4/1996 | | JP | 7-123642 | 5/1995 |
| EP | 0 858 147 | 8/1998 | | JP | 9-172748 | 6/1997 |
| GB | 2 202 170 | 9/1988 | | JP | 10-166398 | 9/1999 |
| JP | PO Sho53-098007 | 8/1976 | | JP | 2000-23432 | 1/2000 |
| JP | 53-98007 | 8/1978 | | JP | 2001-169501 | 5/2001 |
| JP | 61-269640 | 11/1986 | | JP | 2000-197295 | 12/2001 |
| JP | 1-123459 | 5/1989 | | WO | PCT/DE96/01489 | 2/1997 |
| JP | 3-265437 | 11/1991 | | WO | PCT/SE00/01521 | 7/2000 |
| JP | 3-293943 | 12/1991 | | | | |
| JP | 4-121364 | 4/1992 | | * cited by examiner | | |
| JP | 5-199716 | 8/1993 | | | | |

METHOD FOR FORMING AN ELECTRIC MOTOR HAVING ARMATURE COATED WITH A THERMALLY CONDUCTIVE PLASTIC

CROSS-REFERENCE TO RELATED APPLICATIONS

This application is a divisional of U.S. patent application Ser. No. 09/756,959 filed on Jan. 9, 2001 now abandoned.

TECHNICAL FIELD

This invention relates to electric motors, and more particularly to an electric motor having an armature which is at least structurally encased within a thermally conductive plastic, and wherein a fan is integrally formed from a portion of the thermally conductive plastic at one end of the armature.

BACKGROUND OF THE INVENTION

Electric motors are used in a wide variety of applications involving power tools such as drills, saws, sanding and grinding devices, yard tools such as edgers and trimmers, just to name a few such tools. These devices all make use of electric motors having an armature and a stator. The armature is typically formed from a lamination stack around which a plurality of windings of magnet wires are wound. The magnet wires are coupled at their ends to tangs on a commutator disposed on an armature shaft extending coaxially through the lamination stack. The ends of the magnet wires are secured to the commutator.

In the manufacturing process for the armature described above, once the magnet wires have been secured to the commutator, a "trickle" resin is applied over the magnet wires and over the ends of the magnet wires where they attached to tangs associated with the commutator. The process of applying the trickle resin is a somewhat difficult process to manage to obtain consistent results. It also has a number of drawbacks, not the least of which is the cost and difficulty of performing it with reliable, consistent results.

Initially, the trickle process requires the use of a relatively large and expensive oven to carefully preheat the partially assembled armatures to relatively precise temperatures before the trickle resin can be applied. The temperature of the trickle resin also needs to be carefully controlled to achieve satisfactory flow of the resin through the slots in the lamination stack of the armature. It has proven to be extremely difficult to achieve consistent, complete flow of the trickle resin through the slots in the lamination stack. As such, it is difficult to achieve good flow inbetween the magnet wires with the trickle resin to satisfactorily insulate the magnetic wires from one another and hold them stationary relative to each other. A cooling period must then be allowed during which air is typically forced over the armatures to cool them before the next manufacturing step is taken. Further complicating the manufacturing process is that the trickle resin typically has a short shelf life, and therefore must be used within a relatively short period of time.

With present day manufacturing techniques, an additional or secondary coating of a higher viscosity trickle resin is often required to protect the armature (and specifically the magnet wires) from abrasive metal particles that are drawn in and over the armature's fan when the armature is used in connection with various grinders and sanders. This serves to further increase the manufacturing cost and complexity of the armature.

Still another drawback with the trickle process is the relatively high number of armatures which are often rejected because of problems encountered during the process of applying the trickle resin to an otherwise properly constructed armature. Such problems can include contamination of the commutator of the armature by the trickle resin during the application process, as well as uneven flow of the trickle resin if the pump supplying the resin becomes momentarily clogged. Accordingly, the difficulty in controlling the trickle resin application process produces a relatively large scrap rate which further adds to the manufacturing cost of electric motors.

Still another disadvantage with present day electric motors is that the fan which is typically attached at one end of the armature is a separately formed component which must be glued or otherwise secured to the armature in a separate manufacturing step. This fan also is typically the first component to fail if the motor is stressed. This occurs when the fan simply melts due to overheating of the motor. The use of a separately formed component also takes up additional space on the armature which increases the overall size of the armature.

In view of the foregoing, it would be highly desirable to eliminate the steps of applying the trickle resin and securing a separately formed fan to an armature. More specifically, it would be highly desirable if these two steps could be replaced by a single step which achieves the object of more thoroughly coating the magnet wires of the armature with a thermally conductive material, in addition to forming an integrally formed fan, all with a single manufacturing step.

SUMMARY OF THE INVENTION

The present invention is directed to an armature for an electric motor which includes a thermally conductive coating applied over the magnet wires wound around the lamination stack thereof, to thereby form an excellent means for dissipating heat and holding the magnet wires stationary as well as holding the ends of the magnet wires secured to tangs on the commutator. It is also a principal object of the present invention to provide a fan which is integrally molded at one end of the armature from the thermally conductive plastic in a single manufacturing step. The integrally molded fan better resists the extreme temperatures that may be encountered if the motor is stressed during use.

In one preferred embodiment the thermally conductive plastic is applied by a well known injection molding process. As such, the need for a trickle oven and the difficult to manage application of the trickle resin is completed eliminated.

The integrally formed fan is formed when the armature is placed into a suitable molding tool during the injection molding process. The resulting injection molded fan is much more resistant to high temperatures that may be encountered during use of the armature with which it is associated, and further requires less space than previously formed, independent fan components. The smaller fan allows the overall dimensions of the armature to be reduced thereby allowing a smaller motor to be formed for a given ampere rating. Forming the fan integrally with the thermally conductive plastic which coats the magnet wires also eliminates the need to insert portions of the fan into the slots in the lamination stack. This allows more room within the slots in the lamination stack for the magnet wires which allows the power rating of the motor to be increased beyond what would normally be attainable with a conventionally attached and independently formed fan component.

The armature of the present invention thus significantly reduces the complexity and cost of the manufacturing process by completely eliminating the steps involving the application of trickle resin and the attachment of a separately formed fan component, which are two of the most expensive and cumbersome manufacturing steps formed with present day electric motors.

BRIEF DESCRIPTION OF THE DRAWINGS

The various advantages of the present invention will become apparent to one skilled in the art by reading the following specification and subjoined claims and by referencing the following drawings in which:

DETAILED DESCRIPTION OF THE PREFERRED EMBODIMENTS

The following description of the preferred embodiment(s) is merely exemplary in nature and is in no way intended to limit the invention, its application, or uses.

The description of the invention is merely exemplary in nature and, thus, variations that do not depart from the gist of the invention are intended to be within the scope of the invention. Such variations are not to be regarded as a departure from the spirit and scope of the invention.

Figure 1:
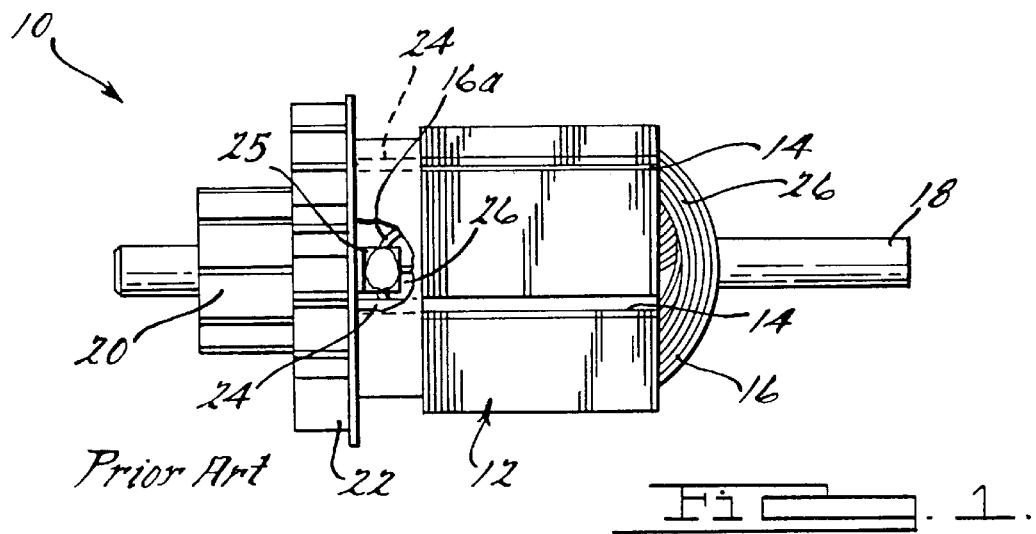
FIG. 1 is a side elevation view of a prior art armature which incorporates the conventional trickle resin coating and separately manufactured fan secured by adhesives to the armature.

Referring to FIG. 1, there is illustrated a prior art armature 10 made in accordance with a conventional manufacturing process incorporating the trickle resin application steps described hereinbefore. The armature 10 incorporates a lamination stack 12 having a plurality of longitudinal slots 14 disposed circumferentially therearound. Wound within the slots 14 is a large plurality of magnet wires 16 forming coils. An armature shaft 18 extends coaxially through the lamination stack 12 and includes a commutator 20. An independently formed plastic fan 22 is secured, typically by adhesives, to the lamination sack 14. The fan 22 typically includes a plurality of legs 24 which project into the slots 14, thus taking up space which would more preferably be occupied by the magnet wires 16. Trickle resin 26 is applied over the magnet wires 16, in the slots 14, and also the tangs 25 where the ends of the magnet wires 16a attach to the commutator 20.

Figure 2:
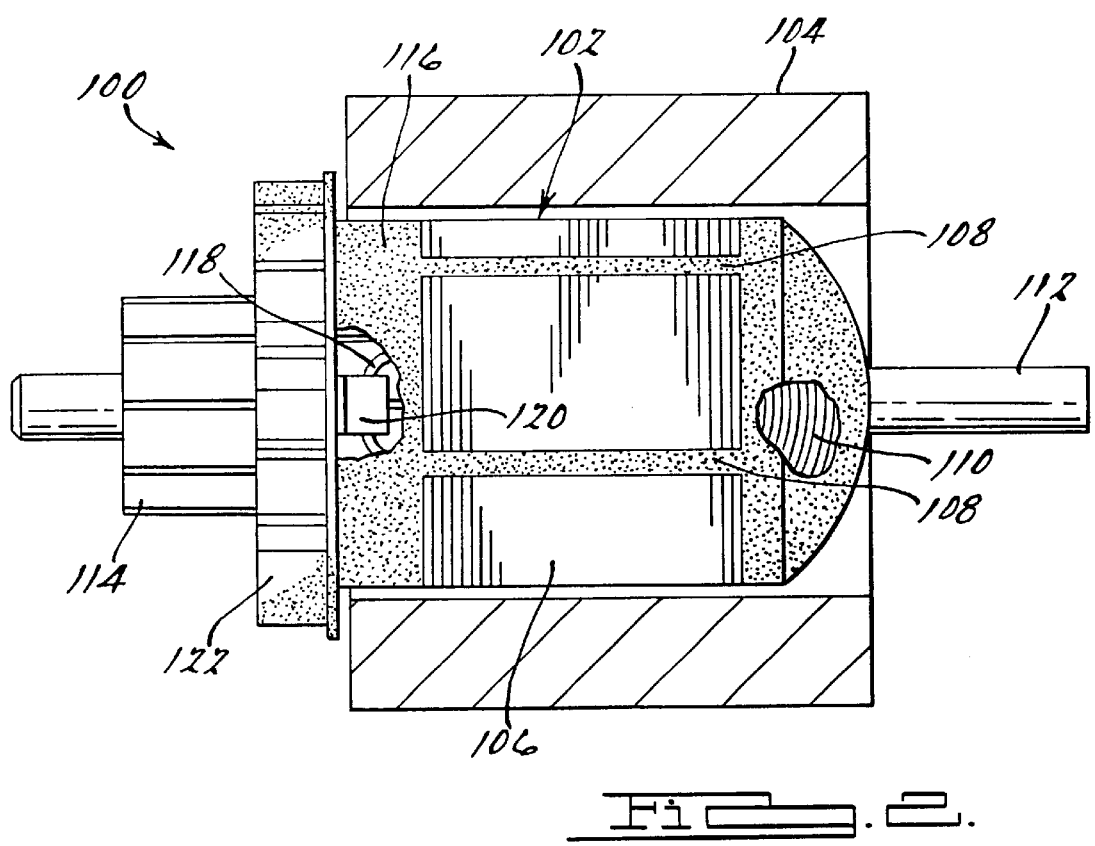
FIG. 2 is a side elevation view of an armature in accordance with a preferred embodiment of the present invention.

Referring now to FIG. 2, a motor 100 in accordance with a preferred embodiment of the present invention is disclosed. The motor 100 includes an armature 102 and a stator 104, the stator being illustrated in highly simplified fashion. The armature 102 incorporates a lamination stack 106 having a plurality of longitudinal slots 108 arranged circumferentially therearound. A plurality of magnet wires 110 are wound in the slots 108 to form a plurality of coil windings. An armature shaft 112 extends coaxially through the lamination stack 16 and has disposed on one end thereof a commutator 114. A thermally conductive plastic coating 116 is injection molded over the armature 102 so that the plastic flows into and through each of the slots 108. The thermally conductive plastic coating 116 is applied by placing the armature 102 in a suitable injection molding tool and then injecting the thermally conductive plastic 116 under a suitably high pressure into the molding tool. The thermally conductive plastic 116 preferably at least partially encases the magnet wires 110, and more preferably completely encases the magnet wires to form an excellent means for transferring heat therefrom. The plastic 116 also encases the ends 118 of the magnet wires 110 which are secured to tangs 120 operably associated with the commutator 114.

A principal advantage of the present invention is that a fan 122 is also integrally formed during the molding of the thermally conductive plastic 116 at one end of the lamination stack 106. Forming the fan 122 as an integral portion of the thermally conductive plastic 116 serves to completely eliminate the manufacturing steps in which a trickle resin is applied to the lamination stack 106 and then a separately formed fan is adhered to the lamination stack 106.

The molding of the thermally conductive plastic 116 to substantially or completely encase the magnet wires 110 serves to efficiently conduct heat away from the magnet wires and also to more evenly fill the gaps inbetween the magnet wires where they extend in the slots 108. Thus, the thermally conductive plastic 116 even more efficiently serve to secure the magnet wires 110 to the lamination stack 106 to prevent movement of the wires, as well as to secure the magnet wires to the tangs 120 and to improve the conduction of heat from the wires.

The molding of the fan 122 as an integral portion of the thermally conductive plastic coating 116 also provides a significant manufacturing benefit by removing the cost associated with separately forming such a fan component and then securing the component via an adhesive to the lamination stack 106. This allows the fan 122 to be constructed even more compactly against the lamination stack 106 which allows a motor to be constructed which requires less space than previously developed motors employing independently formed fan.

In the preferred embodiment the thermally conductive plastic coating 116 comprises Konduit™ thermoplastic commercially available from LNP Engineering Plastics of Exton, Pa. However, it will be appreciated that any material which could be injected molded and which is thermally conductive could be used.

Another advantage of having the fan 122 molded from the thermally conductive plastic is that the fan will be even more resistant to high temperatures which might be encountered during use which stresses the motor 100. With previously developed motors, the fan mounted to the armature thereof is often the first component to fail because of high temperatures encountered during periods of high stress of the motor. The armature 100 of the present invention, with its integrally molded fan 122, is significantly more resistant to failure due to high temperatures. The injection molding of a thermally conductive plastic also more efficiently fills the spaces and voids inbetween the magnet wires 110 extending through the lamination stack slots 108, thus promoting even more efficient cooling of the armature 102 during use. The increase in heat transfer is expected to allow even larger gauge magnet wires 110 to be employed on a given size armature, thus increasing the amp rating which can be attained with a motor of given dimensions over a comparably sized motor employing trickle resin sealing of the magnet wires.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A method for forming an electric motor, said method comprising the steps of:

providing a stator;

winding a plurality of magnet wires in slots in a lamination stack of armature; and molding a thermally conductive plastic over at least a portion of said armature to at least partially encase said magnet wires and to mold a fan at one end of said armature without any portion of the fan extending into the slots in the lamination stack to increase the volume in the slots in which magnet wires can be wound, and winding the magnet wires in the slots includes winding them in the slots in the lamination stack including in the increased volume in the slots made available by molding the fan so that no portion of it extends into the slots thereby increasing a power rating of the electric motor beyond what is normally attainable with a fan having portions extending into the slots in the lamination stack.

2. The method of claim 1, wherein molding the thermally conductive plastic comprises molding a composite thermoplastic.

3. A method for forming an armature for an electric motor, said method comprising the steps of:

providing a lamination stack having slots therein;

providing an armature shaft for supporting said lamination stack;

providing a commutator disposed on said armature;

winding a plurality of magnet wires in the slots in the lamination stack and securing ends of said magnet wires to said commutator;

molding a thermally conductive plastic coating over a substantial portion of said lamination stack to at least substantially encase said magnet wires therein and to mold a fan adjacent one end of said lamination stack without any portion of the fan extending into the slots in the lamination stack to increase the volume in the slots in which magnet wires can be wound, and winding the magnet wires in the slots in the lamination stack includes winding them in the slots in the lamination stack including in the increased volume in the slots made available by molding the fan so that no portion of it extends into the slots thereby increasing a power rating of the electric motor beyond what is normally attainable with a fan having portions extending into the slots in the lamination stack.

4. The method of claim 3, wherein molding the thermally conductive plastic using a composite thermoplastic.

* * * * *

UNITED STATES PATENT AND TRADEMARK OFFICE
CERTIFICATE OF CORRECTION

PATENT NO.    : 6,735,846 B2
DATED         : May 18, 2004
INVENTOR(S)   : Hung T. Du It is certified that error appears in the above-identified patent and that said Letters Patent is hereby corrected as shown below:

<u>Column 4,</u>
Line 64, after "of" insert -- an --.

<u>Column 6,</u>
Line 6, "therein" should be -- therewithin --.
Line 19, after "plastic" insert -- comprises --.

Signed and Sealed this

Seventh Day of September, 2004

JON W. DUDAS
*Director of the United States Patent and Trademark Office*